No. 764,694. Patented July 12, 1904.

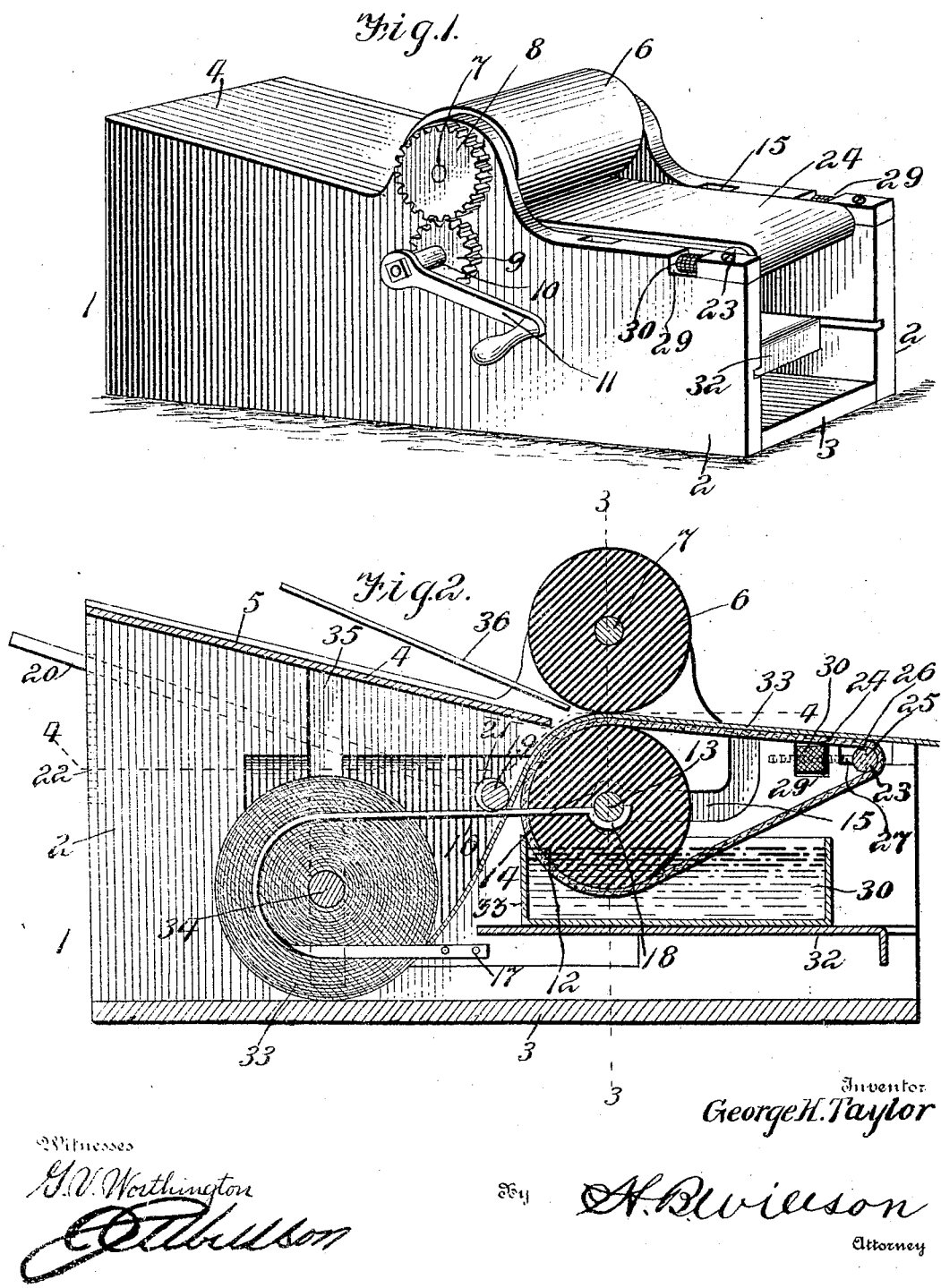

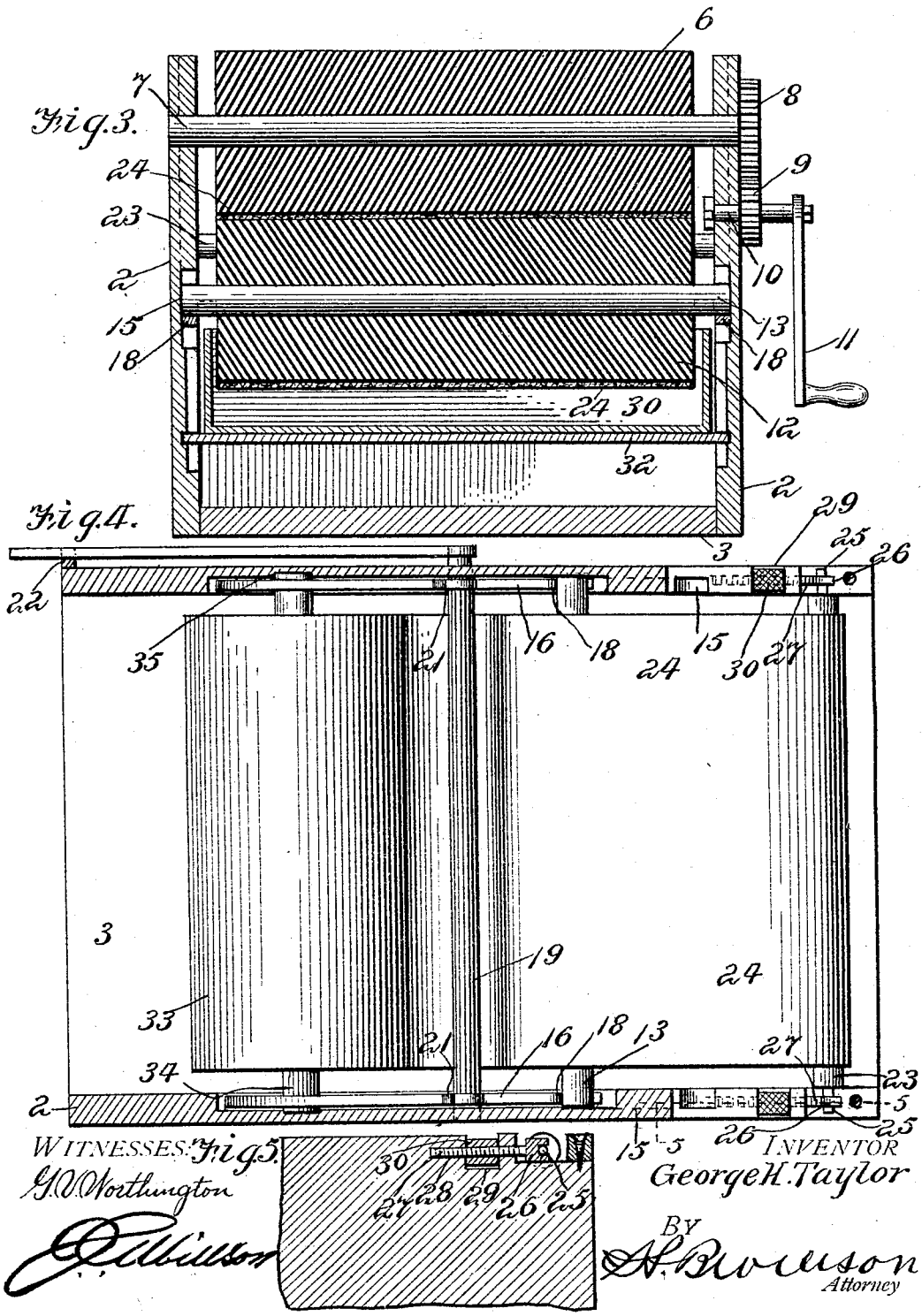

UNITED STATES PATENT OFFICE.

GEORGE H. TAYLOR, OF NORFOLK, VIRGINIA.

COPYING-PRESS.

SPECIFICATION forming part of Letters Patent No. 764,694, dated July 12, 1904.

Application filed May 7, 1903. Serial No. 156,098. (No model.)

*To all whom it may concern:*

Be it known that I, GEORGE H. TAYLOR, a citizen of the United States, residing at Norfolk, in the county of Norfolk and State of Virginia, have invented certain new and useful Improvements in Copying-Presses; and I do declare the following to be a full, clear, and exact description of the invention, such as will enable others skilled in the art to which it appertains to make and use the same.

This invention relates to certain new and useful improvements in letter-copying presses.

The object of the invention is to produce a machine of this character which is simple in construction, durable in use, efficient in operation, and comparatively inexpensive of production.

With this and other objects in view the invention consists of certain novel features of construction, combination, and arrangement of parts, as will be hereinafter more fully described, and particularly pointed out in the appended claims, reference being had to the accompanying drawings, in which—

Figure 1 is a perspective view of my improved copying-press. Fig. 2 is a vertical longitudinal sectional view through the same. Fig. 3 is a cross-sectional view taken on the line 3 3 of Fig. 2. Fig. 4 is a horizontal sectional view taken on the line 4 4 of Fig. 2, and Fig. 5 is a detail vertical sectional view taken on the line 5 5 of Fig. 4.

Referring to the drawings in detail, the numeral 1 denotes a casing or frame within which the operating parts of my invention are mounted. Said casing consists of the two sides 2, secured to the base or bottom 3 and has both of its ends open. The top of the casing at the rear or discharge end is open; but the forward end of the top is adapted to be closed by the removable cover 4, which is inclined downwardly toward the center of the machine to facilitate the feeding of the letters, as hereinafter explained. The cover 4 has its side edges slidably engaged with grooves 5, formed in the sides 2 of the casing. At about the center of the casing and transversely disposed above the same is a roller 6, of any suitable material of an elastic nature, preferably soft rubber. Said roller has its shaft 7 journaled in suitable bearings formed in the sides 2 of the casing at opposite points. On one end of said shaft 6, upon the outside of the casing, is secured a cog-wheel or gear 8 of large diameter. The gear 8 is in mesh with and is driven by a small cog-wheel or pinion 9, which is journaled upon a stub-shaft 10, projecting from the side of the casing. An operating crank-handle 11 is secured to said pinion 9. It will be seen by providing the small pinion with its operating-handle and gearing the same with the large gear that the latter may be readily and easily turned to rotate the roller 6 and feed the letters, as hereinafter described.

In line with and below the roller 6 is a pressure-roller 12, preferably of hard or vulcanized rubber. The ends of the shaft 13 of this roller are engaged with or slidably mounted in vertical grooves 14, formed upon the inner faces of the sides 2 of the casing. These grooves communicate with the grooves 15, which extend rearwardly and then upwardly to the top of the sides 2 to permit of the removal of the roller, as will be readily understood. The roller 12 is supported in the vertical grooves 14 and is forced up against the upper roller 6 by the springs 16. One end of each of these springs is bolted, riveted, or otherwise secured to the inner faces of the sides 2, as seen at 17, and the opposite ends of said springs are bent to form the curved seats or bearings 18, which receive the ends of the shaft 13. The pressure which these springs exert to force the roller 12 against the roller 6 may be varied and regulated in any desired manner. I preferably provide a transverse regulating or relief bar or shaft 19, which is operated by the lever 20. This relief-bar has its ends journaled in the sides 2 of the casing and is provided with the cams or semicircular enlargements 21, which engage or bear upon the springs 16. The hand-lever 20, which is of spring metal, is secured to one end of the shaft outside of the casing. It will be readily seen that when the lever 20 is pressed downwardly toward the base of the machine these cam portions or semicircular swellings 21 will come in contact with the springs 16 and depress the same to gradually diminish the pressure exerted by the springs upon the shaft of the roller 12. By thus operating the lever 20 the lower roller 12 may be made to bear with any desired pressure against the upper roller 6. Any desired means may be employed to hold the lever in an adjusted position. I preferably provide one of the sides 2 at the front end with a series of notches or teeth 22, with which the spring-lever 20 may be engaged. By pressing this lever outwardly away from the teeth it may be moved up or down to the desired position, and when released it will spring in toward the teeth, and thus be locked against casual displacement.

While I have described and illustrated the preferred arrangement of the pressure-springs and relief-bar, it will be understood that I do not limit myself to this construction. Any arrangement of springs and relief-bar upon either one or both of the rollers for relieving and regulating the pressure of the rollers can be used.

Passing around said roller 12 and around a second roller 23 is an endless belt 24, of some absorbent material, such as cloth or fabric. The roller 23 is of much less diameter than the roller 12 and is disposed across the rear end of the casing. It is also disposed so that its axis is above the axis of the roller 12, but so that the upper portion of its periphery is in line or approximately in line with the upper portion of the periphery of said roller 12. By this arrangement of the rollers it will be observed that the belt 4 is so extended that the upper portion thereof is horizontally arranged between the two rollers and forms a straight moistening stretch, while the lower portion thereof is inclined upwardly from the roller 12 to the roller 23 to form an angularly-disposed return stretch, thus producing an acute angle at the delivery end of the belt—viz., at that end at which the roller 23 is located. The roller 23 is journaled so as to be adjusted toward and from the roller 12, for a purpose hereinafter explained. This is preferably done by providing each end of said roller with the journals or trunnions 25, which are engaged by or seated in the forked or bifurcated ends 26 of the screws 27. Each screw 27 passes through the apertures 28 and a slot 29 formed in the side 2 of the casing. An operating-nut 30 upon said screw is disposed in said slot 29 to prevent it having longitudinal movement. When the nut is rotated, it will be seen that the screw 27 will be moved longitudinally, and thus adjust the small roller 24, as will be readily understood upon reference to Figs. 4 and 5 of the drawings.

The roller 12 is adapted to project into a receptacle or pan 31, containing water or other liquid. Said pan is supported beneath the roller in any desired manner, but preferably by means of a removable shelf 32, which slides longitudinally in grooves cut in the sides 2 of the casing. By reason of this sliding movement it will be noticed that the end 33 of the pan may be moved so as to engage the fabric belt upon the roller 12 and scrape or remove the superfluous amount of water from the same.

The tissue 33, upon which the copy is to be made, is rolled in a continuous sheet or web upon a shaft or roller 34. If desired, I may make the roll of paper of a number of sheets of any desired size, with their ends pasted or attached together by some soluble mucilage or cement in order to form a continuous web. When the tissue is moistened by passing over the wet band or fabric belt, the mucilage is dissolved, and the sheet upon which the copy is made may be pulled loose from the next sheet, thus permitting the copy to be taken from the machine with the letter which has been copied. The roll of tissue is disposed in the front portion of the casing beneath the cover 4. The ends of the shaft 34 engage the vertical guides or grooves 35, formed upon the inside of the casing, and slide downwardly in the same when said roll is unwound as the paper is used. The web of copying-tissue 33 passes from the roll under the transversely-disposed relief-bar, which acts as a guide for the tissue, and then up over the fabric belt between the rollers 6 and 12.

In the operation of the machine when the parts are properly adjusted the letter or sheet 36, a copy of which is desired, is inserted, as shown in Fig. 2, between the rollers 6 and 12, and the operating-handle 11 is turned to feed said letter between the upper roller 6 and the web of copying-tissue, which has become moistened by contact with the absorbent belt 24. The belt as it passes through the water in the pan beneath the roller 12 becomes thoroughly saturated in order to dampen the copying-tissue 33. The amount of water that the band carries up over the roller 12 is regulated by adjusting the small roller 23 by means of the nuts 30 and screws 27, which act upon the small roller 23 to tighten or loosen the fabric band or belt. It will be readily seen that when the band is loose it will absorb and carry more water than when it is tightly stretched. The pressure of the roller 12 may be easily regulated by means of the lever 20, as previously described, and as the sheet or letter which is being copied passes between the rollers it will be carried rearwardly by the belt and discharged at the end of the machine. When the pressure of the spring on the rollers 6 and 12 is removed by throwing the lever 20 down to its lowest position, the roller 12 may be easily removed from the casing by allowing the ends of its shaft to slide in the grooves 15, and thus a new belt may be placed upon the rollers to replace a worn-out one or to otherwise repair and clean out the machine.

Owing to the small size of the roller 23 and the acute angle of the belt formed thereby, the copying-tissue and letter will not stick to the belt and be carried back into the casing, but will be disengaged therefrom and pass over the rear end of the casing. It will be seen that by providing the fabric belt upon the large pressure-roller and the small adjusting-roller 23 and passing the same through the water in the pan the copying-tissue will be thoroughly and evenly dampened on the copying side, and a very simple and efficient machine is thus produced. The band or belt contacts with and moistens the under side of the tissue, so that the water will soak through the same to form an evenly-moistened upper or copying side, and thereby permit a perfect copy of the letter to be made.

It will be understood that while I have illustrated and described the preferred arrangement of the fabric band and the rollers 6, 12, and 23 various other arrangements of these parts may be had for accomplishing the same results, and I do not care to be limited to the precise construction shown and described.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A copying-press having a suitably-guided absorbent belt, and a water-reservoir for moistening the belt, said reservoir having a part to engage and remove surplus moisture from the belt, substantially as described.

2. A copying-press having a suitably-guided absorbent belt, and a water-reservoir for moistening the belt, said reservoir having a part to engage and remove surplus moisture from the belt, and adjustable to regulate the pressure of said part on the belt, substantially as described.

3. In a device of the character described, the combination of a suitable frame or casing, a roller journaled in said frame, a traveling moistener-belt passed about suitable rollers in said frame, springs for supporting one of the latter-mentioned rollers against the first-mentioned roller, and a relief-bar directly engaging the springs for regulating the tension of said springs, substantially as described.

4. In a device of the character described, the combination of a suitable frame or casing, a roller journaled in said frame, a traveling moistener-belt passed about suitable rollers in said frame, springs engaging the shaft of one of the latter-mentioned rollers for supporting it against the first-mentioned roller, a relief-bar provided with cams directly engaging said springs, and means for holding said bar in an adjusted position, substantially as described.

5. In a device of the character described, the combination of a suitable frame or casing, a roller journaled in said frame, a traveling moistener-belt passed about suitable rollers in said frame, springs engaging the shaft of one of the latter-mentioned rollers for supporting it against the first-mentioned roller, a relief-bar provided with cams adapted to engage said springs, a lever for operating said relief-bar, and a rack upon said frame adapted to hold said lever in an adjusted position, substantially as described.

6. In a copying-press, pressure-rolls, a moistening-belt passing between said rolls, springs for supporting one of said rolls, a feed-roll for the copying-paper, and means for guiding the paper from the feed-roll to the pressure-rolls and regulating the tension of said springs, substantially as described.

7. In a copying-press, pressure-rolls, a moistening-belt passing between said rolls, springs for supporting one of said rolls, a feed-roll for the copying-paper, and an adjustable presser-bar engaging the springs to regulate their tension, and forming a guide for the paper on its passage from the feed-roll to the pressure-rolls, substantially as described.

8. A copying-press, having pressure-rolls, supporting-springs for one of said rolls, an absorbent belt suitably guided and movable between the rolls, a pressure-bar directly engaging the springs to regulate the tension thereof, a handle for adjusting said bar, and means for locking the handle in adjusted position, substantially as described.

9. In a device of the character described, the combination of a suitable frame or casing, a roller journaled therein, a removable spring-actuated roller in said frame, coacting with the first-mentioned roller, an adjustable tension-roller in said frame, a belt of absorbent material passed about said pressure and tension rollers, a receptacle or pan adjustably mounted beneath the pressure-roller, and adapted to contain a suitable bath to moisten said belt, said reservoir having a part to engage and remove the surplus moisture from the paper, and a roll of copying-tissue mounted in said frame, said tissue being adapted to be fed together with the letters to be copied, between the first-mentioned roller and said belt, substantially as described.

10. In a device of the character described, the combination of a suitable frame or casing, a roller journaled therein, a pressure-roller coacting with said roller and having its ends seated in grooves in said frame whereby said roller may be removed, springs for supporting said pressure-roller, a cam relief-bar for controlling said springs, an adjustable tension-roller in said frame, a belt of absorbent material passed about said pressure and tension rollers, a receptacle slidably mounted beneath said pressure-roller and adapted to contain a suitable bath to moisten said belt, and a roll of copying-tissue in said frame, said tissue being adapted to be fed together with the letters to be copied, between the first-mentioned roller and said belt, substantially as described.

11. A copying-press having pressure-rolls, supporting-plate springs, each fixed at one end and having opposite ends provided with seats or bearings engaging the shaft of one of said rolls, and thus yieldingly supporting said rolls, an absorbent belt suitably guided and traveling between the rolls, a pressure-bar engaging the free ends of the plate-springs to regulate the tension thereof and the pressure of the adjustable roll against the other roll, and means for operating said pressure-bar, substantially as described.

In testimony whereof I have hereunto set my hand in presence of two subscribing witnesses.

GEORGE H. TAYLOR.

Witnesses:
 JAS. C. SMYTH,
 J. MURRAY PRIEST.